US012494580B2

(12) United States Patent
Jing et al.

(10) Patent No.: US 12,494,580 B2
(45) Date of Patent: Dec. 9, 2025

(54) ANTENNA AND COMMUNICATION DEVICE

(71) Applicant: ZTE Corporation, Guangdong (CN)

(72) Inventors: Hongbo Jing, Guangdong (CN); Fei Cao, Guangdong (CN); Dianping Xu, Guangdong (CN); Jianqiang Chen, Guangdong (CN)

(73) Assignee: ZTE Corporation, Shenzhen (CN)

( * ) Notice: Subject to any disclaimer, the term of this patent is extended or adjusted under 35 U.S.C. 154(b) by 1 day.

(21) Appl. No.: 18/593,769

(22) Filed: Mar. 1, 2024

(65) Prior Publication Data

US 2024/0204410 A1 Jun. 20, 2024

Related U.S. Application Data

(63) Continuation of application No. PCT/CN2022/105565, filed on Jul. 13, 2022.

(30) Foreign Application Priority Data

Sep. 3, 2021 (CN) ......................... 202111034321.X

(51) Int. Cl.
*H01Q 1/22* (2006.01)
*H01Q 1/38* (2006.01)
*H01Q 9/04* (2006.01)

(52) U.S. Cl.
CPC ............. *H01Q 9/0407* (2013.01); *H01Q 1/38* (2013.01)

(58) Field of Classification Search
CPC .......... H01Q 9/0407; H01Q 1/38; H01Q 9/40; H01Q 11/16; H01Q 1/2291
See application file for complete search history.

(56) References Cited

U.S. PATENT DOCUMENTS 5,742,209 A * 4/1998 Lemke .................... H01J 25/36 331/82
6,034,572 A * 3/2000 Eastwood ............... H01J 25/36 331/82

(Continued)

FOREIGN PATENT DOCUMENTS

CN 109950690 A 6/2019
CN 111384590 A 7/2020

OTHER PUBLICATIONS

International Search Report and Written Opinion for International Application No. PCT/CN2022/105565, mailed on Sep. 21, 2022, 8 pages with English translation.

(Continued)

*Primary Examiner* — David E Lotter
(74) *Attorney, Agent, or Firm* — Perkins Coie LLP

(57) ABSTRACT

An antenna includes a first patch and a second patch, where one of the first patch and the second patch is a choke patch, and the other one of the first patch and the second patch is a radiation patch. The first patch includes a first body, a first periodic slow wave line structure, and a first pad, the first body is provided with a first side and is provided with a first accommodating notch on the first side, and the first periodic slow wave line structure is located within the first accommodating notch and connected with an edge of the first accommodating notch. The second patch includes a second body and a second pad. In addition, embodiments of the disclosed technology further provide a communication device that includes the antenna.

20 Claims, 7 Drawing Sheets

(56) References Cited

U.S. PATENT DOCUMENTS

| | | | |
|---|---|---|---|
| 2009/0195459 | A1 | 8/2009 | Chua |
| 2020/0343643 | A1 | 10/2020 | Zhang et al. |

OTHER PUBLICATIONS

European Search Report issued in EP Patent Application No. 22862906.9, dated Aug. 8, 2025, 11 pages.

Lai, et al., "Half-Mode Substrate Integrated Waveguide Transverse Slot Array Antennas," IEEE Transactions on Antennas and Propagation, vol. 57, No. 4, Apr. 2009, pp. 1064-1072, 9 pages.

Chinese office action issued in CN Patent Application No. 202111034321.X, dated Aug. 16, 2025, 18 pages. English translation included.

* cited by examiner

ANTENNA AND COMMUNICATION DEVICE

CROSS-REFERENCE TO RELATED APPLICATIONS

This application is a continuation of International Patent Application No. PCT/CN2022/105565, filed on Jul. 13, 2022, which claims priority to Chinese Patent Application No. 202111034321.X, filed on Sep. 3, 2021. The entire contents of the before-mentioned patent applications are incorporated by reference as part of the disclosure of this application.

TECHNICAL FIELD

Embodiments of the disclosed technology generally relate to wireless communication, and more specifically to an antenna and a communication device.

BACKGROUND

With advance in science and technology, a wireless communication technology has also made great progress, and plays an important role in development of modern industry and daily life. An antenna, as a signal transceiver in the wireless communication technology, has been widely used in various communication devices.

At present, wavelengths of a choke patch and a radiation patch of the antenna are fixed and cannot be altered at specific working frequency. Sizes of the choke patch and the radiation patch are determined by the wavelengths thereof, such that the sizes of the choke patch and the radiation patch are also fixed and cannot be altered at specific working frequency. In this way, the sizes of the choke patch and the radiation patch of the antenna cannot be reduced, and thus the antenna cannot develop in a miniaturized direction, which also restricts a communication device using the antenna from developing in the miniaturized direction.

Therefore, it is urgent to provide an antenna and a communication device, which can develop in a miniaturized direction.

SUMMARY

Embodiments of the disclosed technology provide an antenna. The antenna includes: a first patch and a second patch. One of the first patch and the second patch is a choke patch, and the other one of the first patch and the second patch is a radiation patch. The first patch includes a first body, a first periodic slow wave line structure, and a first pad. The first body is provided with a first side and is provided with a first accommodating notch on the first side. The first periodic slow wave line structure is located within the first accommodating notch and connected with an edge of the first accommodating notch. The first pad is located on the first body and connected with the first body. The first accommodating notch penetrates the first body in a thickness direction of the first body. The second patch includes a second body and a second pad. The second pad is located on the second body and connected with the second body. The first pad is arranged adjacent to the second pad. The first body and the second body are sequentially arranged in a first direction. A gap is provided between the first body and the second body.

The embodiments of the disclosed technology further provide a communication device. The communication device includes the antenna.

BRIEF DESCRIPTION OF THE DRAWINGS

In order to more clearly illustrate technical solutions of embodiments of the disclosed technology, the drawings required for description of the embodiments will be described briefly below. Obviously, the drawings in the following description are merely some embodiments of the disclosed technology. Those of ordinary skill in the art can also obtain other drawings according to these drawings without creative efforts.

DETAILED DESCRIPTION

The disclosed technology can be implemented in some embodiments to provide an antenna and a communication device, which can be miniaturized.

Those of ordinary skill in the art can understand that many technical details have been put forward in all the embodiments of the disclosed technology such that readers can better understand the disclosed technology. However, even without these technical details and various changes and modifications based on the following embodiments, technical solutions to be protected by the disclosed technology can be implemented. All the following embodiments are divided for convenience of description, and should not constitute any limitation on specific embodiments of the disclosed technology. All the embodiments can be combined with each other and cited without contradiction.

In the antenna according to some embodiments of the disclosed technology, one of a first patch and a second patch is a choke patch, and the other one of the first patch and the second patch is a radiation patch. The first patch includes a first body and a first periodic slow wave line structure. The first body is provided with a first side and is provided with a first accommodating notch on the first side. The first periodic slow wave line structure is located within the first accommodating notch and connected with an edge of the first accommodating notch. The first accommodating notch penetrates the first body in a thickness direction of the first body. In this way, an equivalent dielectric constant of the first patch can be increased, such that an equivalent wavelength of the first patch can be reduced, a size of the first patch can be reduced accordingly, further a size of the choke patch or the radiation patch can be reduced, and the antenna and the communication device can be miniaturized. In addition, the first patch further includes a first pad located on the first body and connected with the first body. The second patch includes a second body and a second pad. The second pad is located on the second body and connected with the second body. The first pad is arranged adjacent to the second pad. The first body and the second body are sequentially arranged in a first direction. A gap is provided between the first body and the second body. In this way, an inner conductor and an outer conductor of the antenna may be connected with the first pad and the second pad, respectively.

In order to make the objective, technical solutions and advantages of the embodiments of the disclosed technology clearer, all the embodiments of the disclosed technology will be described below in detail with reference to accompanying drawings.

Figure 1:
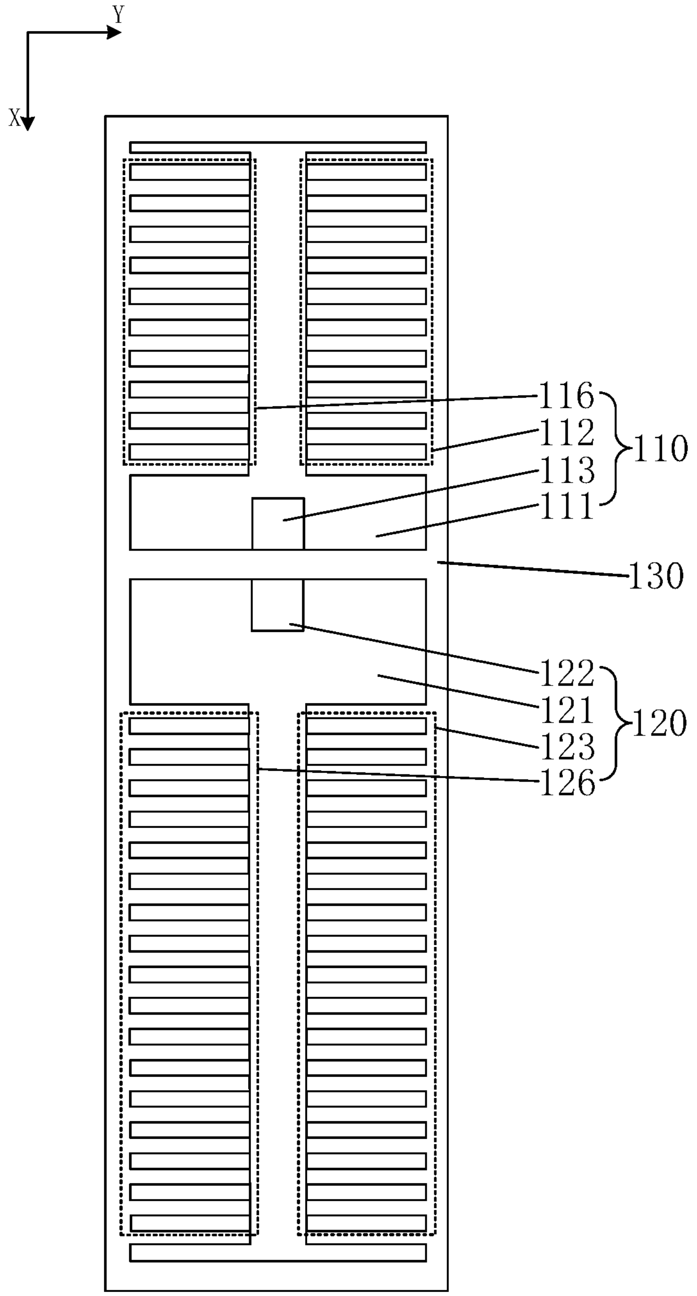
FIG. 1 is a schematic structural diagram of an antenna according to some embodiments of the disclosed technology.
Figure 2:
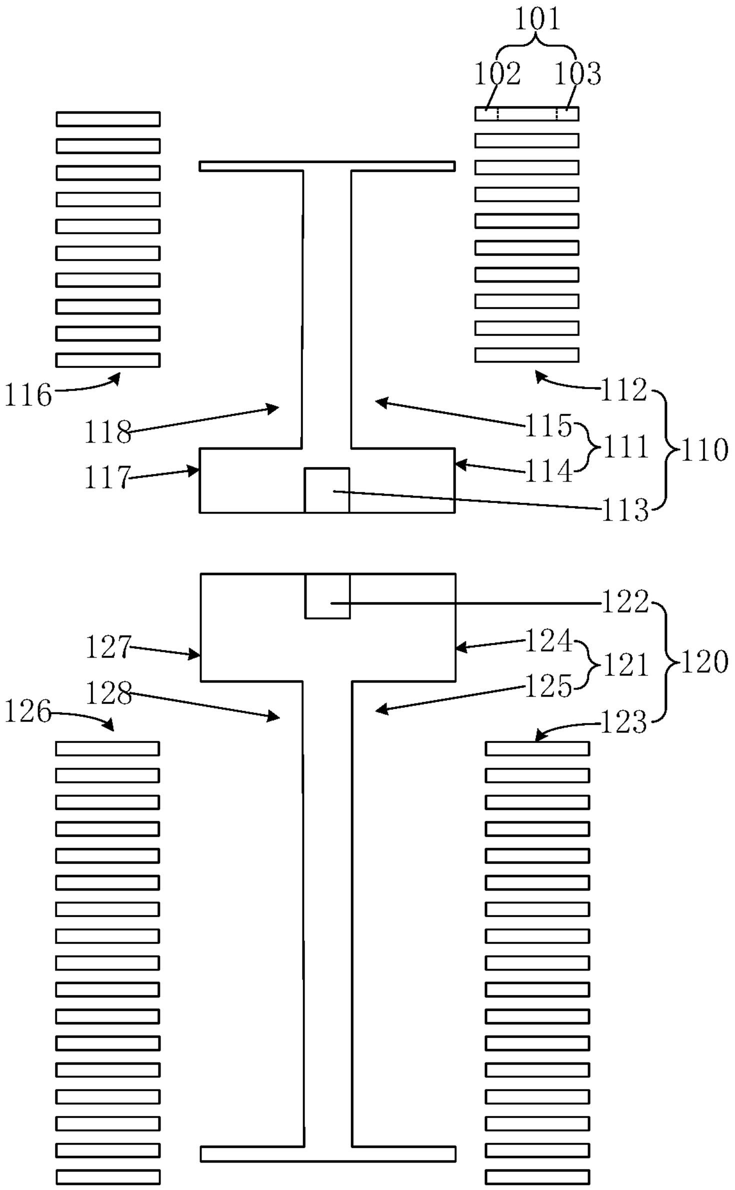
FIG. 2 is an exploded view of a structure of a first patch and a second patch according to some embodiments of the disclosed technology.

With reference to FIGS. 1 and 2, some embodiments of the disclosed technology provide an antenna. The antenna includes: a first patch 110 and a second patch 120. One of the first patch 110 and the second patch 120 is a choke patch, and the other one of the first patch and the second patch is a radiation patch. The first patch 110 includes a first body 111, a first periodic slow wave line structure 112, and a first pad 113. The first body 111 is provided with a first side 114 and is provided with a first accommodating notch 115 on the first side 114. The first periodic slow wave line structure 112 is located within the first accommodating notch 115 and connected with an edge of the first accommodating notch 115. The first pad 113 is located on the first body 111 and connected with the first body 111. The first accommodating notch 115 penetrates the first body 111 in a thickness direction of the first body 111. The second patch 120 includes a second body 121 and a second pad 122. The second pad 122 is located on the second body 121 and connected with the second body 121. The first pad 113 is arranged adjacent to the second pad 122. The first body 111 and the second body 121 are sequentially arranged in a first direction (that is, direction X shown in FIG. 1). A gap is provided between the first body 111 and the second body 121.

In the embodiments, illustration is conducted with the first patch 110 being the choke patch and the second patch 120 being the radiation patch as an instance. It should be noted that in other embodiments, the first patch 110 may also be the radiation patch, and accordingly the second patch 120 is the choke patch.

In some embodiments, a length of the choke patch (that is, the first patch 110) in the first direction is a quarter of a wavelength of central working frequency of the antenna. In this way, the choke patch may be configured to adjust an impedance matching condition of a feeder at a feed input end, such that the antenna has desirable impedance matching characteristics, further impedance matching between the antenna and a coaxial feeder is achieved, and signal gain of the antenna is enhanced. In some embodiments, a length of the radiation patch (that is, the second patch 120) in the first direction is a half of a wavelength of central working frequency of the antenna. In this way, a high-gain radiation function of the antenna can be achieved.

In some embodiments, the first pad 113 on the first patch 110 is a ground point, and the second pad 122 on the second patch 120 is a feed point. In some embodiments, shapes of the first pad 113 and the second pad 122 are both squared. It should be noted that the disclosed technology does not limit the shapes of the first pad 113 and the second pad 122. In yet other embodiments, the shapes of the first pad 113 and the second pad 122 are both circular. In still other embodiments, the shape of the first pad 113 is triangular and the shape of the second pad 122 is circular.

In some embodiments, the first patch 110 further includes a second periodic slow wave line structure 116. The first body 111 is further provided with a second side 117 opposite the first side 114 and is provided with a second accommodating notch 118 on the second side 117. The second periodic slow wave line structure 116 is located within the second accommodating notch 118 and connected with an edge of the second accommodating notch 118. The second accommodating notch 118 penetrates the first body 111 in the thickness direction of the first body 111.

In this way, the first side 114 is opposite the second side 117, the first accommodating notch 115 is opposite the second accommodating notch 118, and further the first periodic slow wave line structure 112 within the first accommodating notch 115 is opposite the second periodic slow wave line structure 116 within the second accommodating notch 118, such that radiation uniformity of the first patch 110 can be improved.

In some embodiments, the second patch 120 further includes a third periodic slow wave line structure 123. The second body 121 is provided with a third side 124 and is provided with a third accommodating notch 125 on the third side 124. The third periodic slow wave line structure 123 is located within the third accommodating notch 125 and connected with an edge of the third accommodating notch 125. The third accommodating notch 125 penetrates the second body 121 in a thickness direction of the second body 121.

In this way, the second patch 120 is provided with the third periodic slow wave line structure 123, and the third periodic slow wave line structure 123 is located within the third accommodating notch 125 and connected with the edge of the third accommodating notch 125, such that an equivalent dielectric constant of the second patch 120 can be increased, an equivalent wavelength of the second patch 120 can be reduced, a size of the second patch 120 can be reduced accordingly, and further the antenna can be miniaturized.

In some embodiments, the second patch 120 further includes a fourth periodic slow wave line structure 126. The second body 121 is further provided with a fourth side 127 opposite the third side 124 and is provided with a fourth accommodating notch 128 on the fourth side 127. The fourth periodic slow wave line structure 126 is located within the fourth accommodating notch 128 and connected with an edge of the fourth accommodating notch 128. The fourth accommodating notch 128 penetrates the second body 121 in the thickness direction of the second body 121.

In this way, the third side 124 is opposite the fourth side 127, the third accommodating notch 125 is opposite the fourth accommodating notch 128, and further the third periodic slow wave line structure 123 within the third accommodating notch 125 is opposite the fourth periodic slow wave line structure 126 within the fourth accommodating notch 128, such that radiation uniformity of the second patch 120 can be improved.

In some embodiments, shapes of the first accommodating notch 115, the second accommodating notch 118, the third accommodating notch 125 and the fourth accommodating notch 128 are all rectangular. It should be noted that the disclosed technology does not limit the shapes of the first accommodating notch 115, the second accommodating notch 118, the third accommodating notch 125 and the fourth accommodating notch 128. In other alternative embodiments, the shapes of the first accommodating notch 115, the second accommodating notch 118, the third accommodating notch 125 and the fourth accommodating notch 128 may not be rectangular. For instance, the shapes of the first accommodating notch 115, the second accommodating notch 118, the third accommodating notch 125 and the fourth accommodating notch 128 are trapezoidal, arched, or triangular.

In some embodiments, the first side 114 is opposite the second side 117 in a second direction (direction Y shown in FIG. 1). The first direction is perpendicular to the second direction. The first periodic slow wave line structure 112 includes a plurality of periodic slow wave lines 101 sequentially arranged in the first direction. Each of the periodic slow wave lines 101 includes a first end 102 and a second end 103. The first end 102 of each of the periodic slow wave lines 101 is connected with the edge of the first accommodating notch 115. The second ends 103 of all the periodic slow wave lines 101 are sequentially arranged in the first direction. In some embodiments, the thickness direction of the first body 111 is perpendicular to the first direction, and the thickness direction of the first body 111 is further perpendicular to the second direction.

In some embodiments, the second periodic slow wave line structure 116 further includes a plurality of periodic slow wave lines 101 sequentially arranged in the first direction. Each of the periodic slow wave lines 101 within the second accommodating notch 118 further includes a first end 102 and a second end 103. The first end 102 of each of the periodic slow wave lines 101 is connected with the edge of the second accommodating notch 118. The second ends 103 of all the periodic slow wave lines 101 are sequentially arranged in the first direction.

In some embodiments, the third side 124 is also opposite the fourth side 127 in the second direction. The third periodic slow wave line structure 123 and the fourth periodic slow wave line structure 126 each include a plurality of periodic slow wave lines 101 sequentially arranged in the first direction. Each of the periodic slow wave lines 101 includes a first end 102 and a second end 103. The first end 102 of each of the periodic slow wave lines 101 within the third accommodating notch 125 is connected with the edge of the third accommodating notch 125. The second ends 103 of all the periodic slow wave lines 101 of the third periodic slow wave line structure 123 are sequentially arranged in the first direction. The first end 102 of each of the periodic slow wave lines 101 within the fourth accommodating notch 128 is connected with the edge of the fourth accommodating notch 128. The second ends 103 of all the periodic slow wave lines 101 of the fourth periodic slow wave line structure 126 are also sequentially arranged in the first direction.

In some embodiments, all the periodic slow wave lines 101 have a same shape. That is, the periodic slow wave lines 101 included in the first periodic slow wave line structure 112, the second periodic slow wave line structure 116, the third periodic slow wave line structure 123 and the fourth periodic slow wave line structure 126 have a same shape. In some embodiments, the periodic slow wave lines 101 each have a linear shape, a curved shape, or a folded shape. In an embodiment, the periodic slow wave lines 101 each have a linear shape.

In some embodiments, the plurality of periodic slow wave lines 101 of the first periodic slow wave line structure 112 are sequentially arranged at equal intervals in the first direction. In this way, radiation intensity of the first patch 110 can be improved. In some embodiments, the antenna further has the second periodic slow wave line structure 116, the third periodic slow wave line structure 123 and the fourth periodic slow wave line structure 126, the plurality of periodic slow wave lines 101 of the second periodic slow wave line structure 116 are sequentially arranged at equal intervals in the first direction, the plurality of periodic slow wave lines 101 of the third periodic slow wave line structure 123 are sequentially arranged at equal intervals in the first direction, and the plurality of periodic slow wave lines 101 of the fourth periodic slow wave line structure 126 are sequentially arranged at equal intervals in the first direction, such that radiation intensity of the first patch 110 and radiation intensity of the second patch 120 are further improved.

In some embodiments, the antenna further includes a dielectric plate 130. The first patch 110 and the second patch 120 are both fixed to the dielectric plate 130. In some embodiments, the dielectric plate 130 is an insulating dielectric plate.

Figure 3:
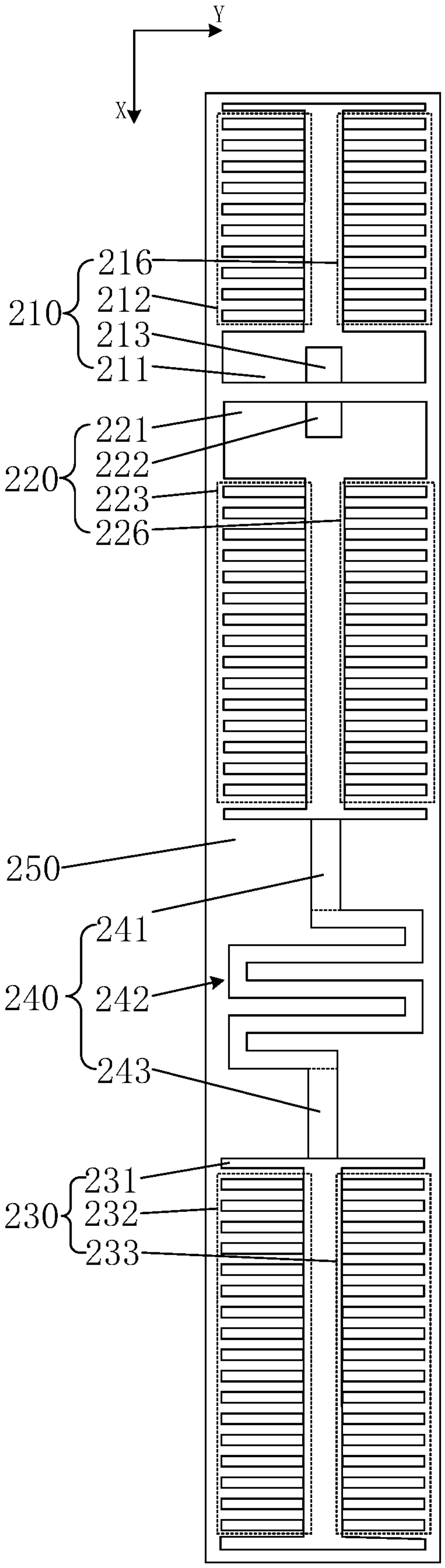
FIG. 3 is a schematic structural diagram of an antenna according to some embodiments of the disclosed technology.
Figure 4:
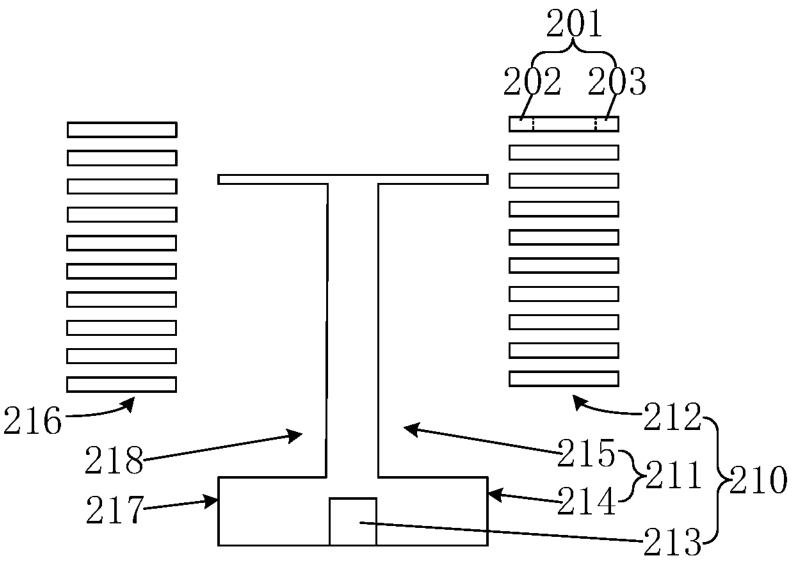
FIG. 4 is an exploded view of a structure of a first patch according to some embodiments of the disclosed technology.
Figure 5:
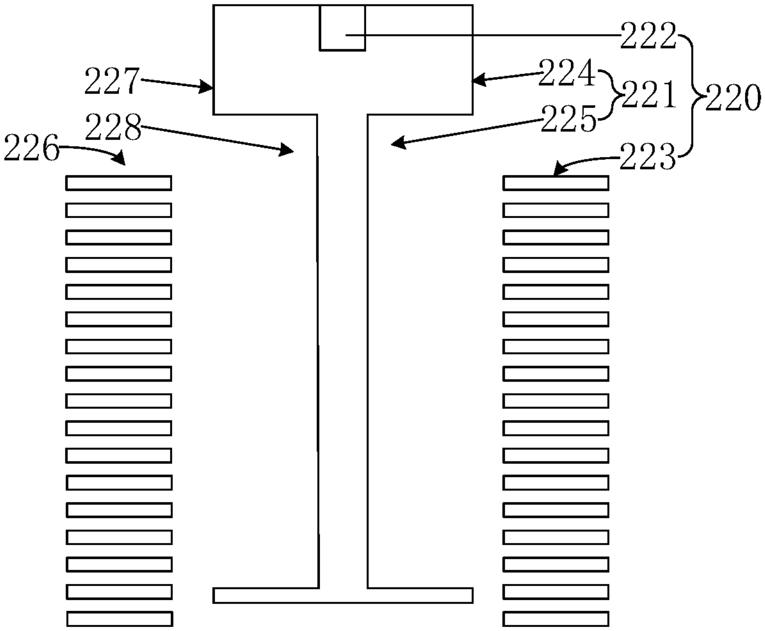
FIG. 5 is an exploded view of a structure of a second patch according to some embodiments of the disclosed technology.
Figure 6:
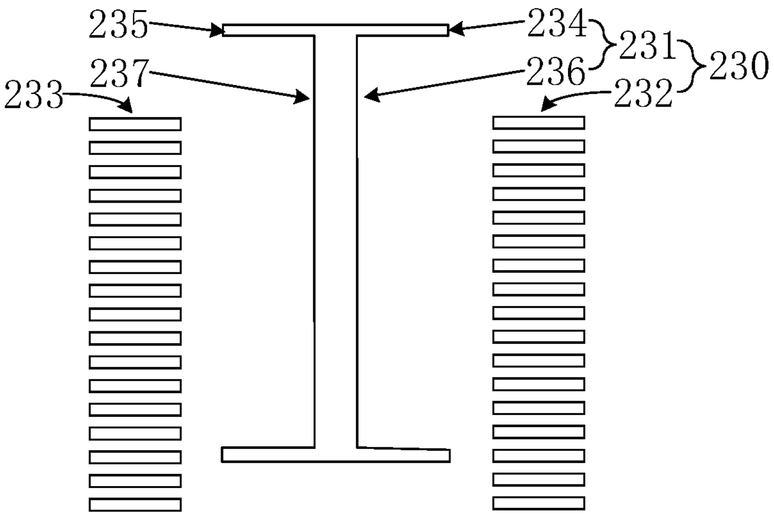
FIG. 6 is an exploded view of a structure of a third patch according to some embodiments of the disclosed technology.
Figure 7:
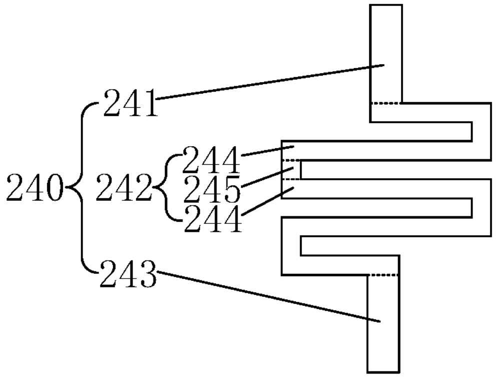
FIG. 7 is a schematic structural diagram of a connecting line according to some embodiments of the disclosed technology.

With reference to FIGS. 3 and 5, some embodiments of the disclosed technology provide an antenna. The antenna includes: a first patch 210 and a second patch 220. One of the first patch 210 and the second patch 220 is a choke patch, and the other one of the first patch and the second patch is a radiation patch. The first patch 210 includes a first body 211, a first periodic slow wave line structure 212, and a first pad 213. The first body 211 is provided with a first side 214 and is provided with a first accommodating notch 215 on the first side 214. The first periodic slow wave line structure 212 is located within the first accommodating notch 215 and connected with an edge of the first accommodating notch 215. The first pad 213 is located on the first body 211 and connected with the first body 211. The first accommodating notch 215 penetrates the first body 211 in a thickness direction of the first body 211. The second patch 220 includes a second body 221 and a second pad 222. The second pad 222 is located on the second body 221 and connected with the second body 221. The first pad 213 is arranged adjacent to the second pad 222. The first body 211 and the second body 221 are sequentially arranged in a first direction (that is, direction X shown in FIG. 3). A gap is provided between the first body 211 and the second body 221.

The antenna according to the embodiments further includes: a third patch 230 and a connecting line 240. One of the first patch 210 and the second patch 220 is a choke patch, the other one of the first patch and the second patch is a first radiation patch. The third patch 230 is a second radiation patch. The choke patch, the first radiation patch, the connecting line 240 and the second radiation patch are sequentially arranged in the first direction or an opposite direction of the first direction. The first radiation patch and the second radiation patch are both connected with the connecting line 240.

It should be noted that the embodiments do not limit the number of radiation patches and the number of connecting lines 240. In other alternative embodiments, other connecting lines and other radiation patches may be provided. For instance, in an embodiment, the antenna includes a choke patch, a first radiation patch, a first connecting line 240, a second radiation patch, a second connecting line and a third radiation patch that are sequentially connected.

The embodiments conducts illustration with the first patch 210 being the choke patch and the second patch 220 being the first radiation patch as an instance. In this case, the choke patch, the first radiation patch, the connecting line 240 and the second radiation patch are sequentially arranged in the first direction. It should be noted that in other alternative embodiments, the first patch may also be the first radiation patch, and accordingly the second patch is the choke patch. The choke patch, the first radiation patch, the connecting line 240 and the second radiation patch are sequentially arranged in the opposite direction of the first direction.

In some embodiments, a length of the choke patch (that is, the first patch 210) in the first direction is a quarter of a wavelength of central working frequency of the antenna. In this way, the choke patch can be configured to adjust an impedance matching condition of a feeder at a feed input end, such that the antenna has desirable impedance matching characteristics, further impedance matching between the antenna and a coaxial feeder is achieved, and signal gain of the antenna is enhanced. In some embodiments, a length of the connecting line 240 in the first direction is a half of a wavelength of central working frequency of the antenna. In this way, a distance between the first radiation patch and the second radiation patch may be a half of the wavelength of the central working frequency of the antenna (which is the length of the connecting line 240 in the first direction), such that surface currents of the first radiation patch and the second radiation patch are in the same phase, further a high-gain radiation function of the antenna is achieved, and a gain superposition effect of the antenna is achieved.

In some embodiments, the first pad 213 on the first patch 210 is a ground point, and the second pad 222 on the second patch 220 is a feed point. In the embodiments, the first pad 213 and the second pad 222 both have a squared shape. It should be noted that the disclosed technology does not limit the shapes of the first pad 213 and the second pad 222. For instance, in yet other embodiments, the first pad 213 and the second pad 222 both have a circular shape. In still other embodiments, the first pad 213 has a triangular shape and the second pad 222 has a circular shape.

In some embodiments, side lengths of the first pad 213 and the second pad 222 are both 1.5 mm to 2.5 mm (mm: millimeter), and a distance between the first pad 213 and the second pad 222 is 1.5 mm to 2.5 mm. In an embodiment, side lengths of the first pad 213 and the second pad 222 are both 2 mm, and a distance between the first pad 213 and the second pad 222 is 2 mm.

It should be noted that the disclosed technology limits neither sizes of the first pad 213 and the second pad 222 nor the distance between the first pad 213 and the second pad 222. In an embodiment, side lengths of the first pad 213 and the second pad 222 are both 1.6 mm, and a distance between the first pad 213 and the second pad 222 is 1.8 mm. In an embodiment, side lengths of the first pad 213 and the second pad 222 are both 3 mm, and a distance between the first pad 213 and the second pad 222 is 1.6 mm.

In some embodiments, the first patch 210 further includes a second periodic slow wave line structure 216. The first body 211 is further provided with a second side 217 opposite the first side 214 and is provided with a second accommodating notch 218 on the second side 217. The second periodic slow wave line structure 216 is located within the second accommodating notch 218 and connected with an edge of the second accommodating notch 218. The second accommodating notch 218 penetrates the first body 211 in the thickness direction of the first body 211. The first side 214 and the second side 217 are sequentially arranged in a second direction. The first direction is perpendicular to the second direction, and the first direction and the second direction are both perpendicular to the thickness direction of the first body 211.

In some embodiments, a size of the first patch 210 in the first direction is 16 mm to 20 mm, a size of the first patch 210 in the second direction is 10 mm to 12 mm, and sizes of the first accommodating notch 215 and the second accommodating notch 218 in the second direction are 4.5 mm to 5.6 mm. In an embodiment, a size of the first patch 210 in the first direction is 19 mm, a size of the first patch 210 in the second direction is 11.5 mm, and sizes of the first accommodating notch 215 and the second accommodating notch 218 in the second direction are 5.2 mm.

It should be noted that the disclosed technology does not limit the size of the first patch 210 in the first direction, the size of the first patch 210 in the second direction, the size of the first accommodating notch 215 in the second direction, and the size of the second accommodating notch 218 in the second direction. In another embodiment, a size of the first patch 210 in the first direction is 18 mm, a size of the first patch 210 in the second direction is 12 mm, and sizes of the first accommodating notch 215 and the second accommodating notch 218 in the second direction are 5 mm.

In some embodiments, the second patch 220 further includes a third periodic slow wave line structure 223. The second body 221 is provided with a third side 224 and is provided with a third accommodating notch 225 on the third side 224. The third periodic slow wave line structure 223 is located within the third accommodating notch 225 and connected with an edge of the third accommodating notch 225. The third accommodating notch 225 penetrates the second body 221 in a thickness direction of the second body 221.

In some embodiments, the second patch 220 further includes a fourth periodic slow wave line structure 226. The second body 221 is further provided with a fourth side 227 opposite the third side 224 and is provided with a fourth accommodating notch 228 on the fourth side 227. The fourth periodic slow wave line structure 226 is located within the fourth accommodating notch 228 and connected with an edge of the fourth accommodating notch 228. The fourth accommodating notch 228 penetrates the second body 221 in the thickness direction of the second body 221. The third side 224 and the fourth side 227 are sequentially arranged in the second direction. The first direction and the second direction are both perpendicular to the thickness direction of the second body 221.

In some embodiments, a size of the second patch 220 in the first direction is 24 mm to 29 mm, a size of the second patch 220 in the second direction is 10 mm to 12 mm, and sizes of the third accommodating notch 225 and the fourth accommodating notch 228 in the second direction are 3.5 mm to 4.5 mm. In an embodiment, a size of the second patch 220 in the first direction is 26 mm, a size of the second patch 220 in the second direction is 12 mm, and sizes of the third accommodating notch 225 and the fourth accommodating notch 228 in the second direction are 4 mm.

It should be noted that the disclosed technology does not limit the size of the second patch 220 in the first direction, the size of the second patch 220 in the second direction, the size of the third accommodating notch 225 in the second direction, and the size of the fourth accommodating notch 228 in the second direction. In another embodiment, a size of the second patch 220 in the first direction is 25.6 mm, a size of the second patch 220 in the second direction is 12 mm, and sizes of the third accommodating notch 225 and the fourth accommodating notch 228 in the second direction are 4.3 mm.

In some embodiments, with reference to FIGS. 3-5 and FIG. 6, the third patch 230 includes a third body 231, a fifth periodic slow wave line structure 232, and a sixth periodic slow wave line structure 233. The third patch 230 is provided with a fifth side 234 and a sixth side 235 opposite the fifth side 234 in the second direction. The third patch 230 is provided with a fifth accommodating notch 236 on the fifth side 234. The third patch 230 is further provided with a sixth accommodating notch 237 on the sixth side 235. The fifth periodic slow wave line structure 232 is located within the fifth accommodating notch 236 and connected with an edge of the fifth accommodating notch 236. The sixth periodic slow wave line structure 233 is located within the sixth accommodating notch 237 and connected with an edge of the sixth accommodating notch 237. The fifth accommodating notch 236 and the sixth accommodating notch 237 both penetrate the third body 231 in a thickness direction of the third body 231. In this way, the fifth side 234 is opposite the sixth side 235, the fifth accommodating notch 236 is opposite the sixth accommodating notch 237, and further the fifth periodic slow wave line structure 232 within the fifth accommodating notch 236 is opposite the sixth periodic slow wave line structure 233 within the sixth accommodating notch 237, such that radiation uniformity of the third patch 230 can be improved. The first direction and the second direction are both perpendicular to the thickness direction of the third body 231.

In some embodiments, a size of the third patch 230 in the first direction is 26 mm to 31 mm, a size of the third patch 230 in the second direction is 10 mm to 12 mm, and sizes of the fifth accommodating notch 236 and the sixth accommodating notch 237 in the second direction are 4 mm to 5.5 mm. In an embodiment, a size of the third patch 230 in the first direction is 28 mm, a size of the third patch 230 in the second direction is 11.5 mm, and sizes of the fifth accommodating notch 236 and the sixth accommodating notch 237 in the second direction are 4.7 mm.

It should be noted that the disclosed technology does not limit the size of the third patch 230 in the first direction, the size of the third patch 230 in the second direction, the size of the fifth accommodating notch 236 in the second direction, and the size of the sixth accommodating notch 237 in the second direction. In another embodiment, a size of the third patch 230 in the first direction is 27 mm, a size of the third patch 230 in the second direction is 12 mm, and sizes of the fifth accommodating notch 236 and the sixth accommodating notch 237 in the second direction are 4.2 mm.

It should also be noted that the third patch 230 may be provided with only the fifth periodic slow wave line structure 232 and not the sixth periodic slow wave line structure 233 in other alternative embodiments. In this way, an equivalent dielectric constant of the third patch 230 can be further increased, such that an equivalent wavelength of the third patch 230 can be reduced, a size of the third patch 230 can be reduced accordingly, and the antenna can be miniaturized.

In some embodiments, the first accommodating notch 215, the second accommodating notch 218, the third accommodating notch 225, the fourth accommodating notch 228, the fifth accommodating notch 236 and the sixth accommodating notch 237 each have a rectangular shape. It should be noted that the disclosed technology does not limit the shapes of the first accommodating notch 215, the second accommodating notch 218, the third accommodating notch 225, the fourth accommodating notch 228, the fifth accommodating notch 236 and the sixth accommodating notch 237. In other alternative embodiments, the first accommodating notch 215, the second accommodating notch 218, the third accommodating notch 225, the fourth accommodating notch 228, the fifth accommodating notch 236 and the sixth accommodating notch 237 may not have a rectangular shape. For instance, the first accommodating notch 215, the second accommodating notch 218, the third accommodating notch 225, the fourth accommodating notch 228, the fifth accommodating notch 236 and the sixth accommodating notch 237 have a trapezoidal shape, an arched shape, or a triangular shape.

In some embodiments, the first side 214 is opposite the second side 217 in a second direction (direction Y shown in FIG. 3). The first direction is perpendicular to the second direction. The first periodic slow wave line structure 212 includes a plurality of periodic slow wave lines 201 sequentially arranged in the first direction. Each of the periodic slow wave lines 201 includes a first end 202 and a second end 203. The first end 202 of each of the periodic slow wave lines 201 is connected with the edge of the first accommodating notch 215. The second ends 203 of all the periodic slow wave lines 201 are sequentially arranged in the first direction.

In some embodiments, the second periodic slow wave line structure 216 further includes a plurality of periodic slow wave lines 201 sequentially arranged in the first direction. Each of the periodic slow wave lines 201 in the second accommodating notch 218 further includes a first end 202 and a second end 203. The first end 202 of each of the periodic slow wave lines 201 is connected with the edge of the second accommodating notch 218. The second ends 203 of all the periodic slow wave lines 201 are sequentially arranged in the first direction.

In some embodiments, the third side 224 is also opposite the fourth side 227 in the second direction. The third periodic slow wave line structure 223 and the fourth periodic slow wave line structure 226 each include a plurality of periodic slow wave lines 201 sequentially arranged in the first direction. Each of the periodic slow wave lines 201 includes a first end 202 and a second end 203. The first end 202 of each of the periodic slow wave lines 201 within the third accommodating notch 225 is connected with the edge of the third accommodating notch 225. The second ends 203 of all the periodic slow wave lines 201 of the third periodic slow wave line structure 223 are sequentially arranged in the first direction. The first end 202 of each of the periodic slow wave lines 201 within the fourth accommodating notch 228 is connected with the edge of the fourth accommodating notch 228. The second ends 203 of all the periodic slow wave lines 201 of the fourth periodic slow wave line structure 226 are also sequentially arranged in the first direction.

In some embodiments, the fifth side 234 is also opposite the sixth side 235 in the second direction. The fifth periodic slow wave line structure 232 and the sixth periodic slow wave line structure 233 each include a plurality of periodic slow wave lines 201 sequentially arranged in the first direction. Each of the periodic slow wave lines 201 includes a first end 202 and a second end 203. The first end 202 of each of the periodic slow wave lines 201 within the fifth accommodating notch 236 is connected with the edge of the fifth accommodating notch 236. The second ends 203 of all the periodic slow wave lines 201 of the fifth periodic slow wave line structure 232 are sequentially arranged in the first direction. The first end 202 of each of the periodic slow wave lines 201 within the sixth accommodating notch 237 is connected with the edge of the sixth accommodating notch 237. The second ends 203 of all the periodic slow wave lines 201 of the sixth periodic slow wave line structure 233 are also sequentially arranged in the first direction.

In some embodiments, all the periodic slow wave lines 201 have a same shape. That is, all the periodic slow wave lines 201 included in the first periodic slow wave line structure 212, the second periodic slow wave line structure 216, the third periodic slow wave line structure 223, the fourth periodic slow wave line structure 226, the fifth periodic slow wave line structure 232 and the sixth periodic slow wave line structure 233 have a same shape. In some embodiments, all the periodic slow wave lines 201 have a linear shape, a curved shape, or a folded shape. In an embodiment, all the periodic slow wave lines 201 have a linear shape.

In some embodiments, the plurality of periodic slow wave lines 201 of the first periodic slow wave line structure 212 are sequentially arranged at equal intervals in the first direction. In this way, radiation intensity of the first patch 210 can be improved. In some embodiments, the antenna further has the second periodic slow wave line structure 216, the third periodic slow wave line structure 223, the fourth periodic slow wave line structure 226, the fifth periodic slow wave line structure 232 and the sixth periodic slow wave line structure 233, the plurality of periodic slow wave lines 201 of the second periodic slow wave line structure 216 are sequentially arranged at equal intervals in the first direction, the plurality of periodic slow wave lines 201 of the third periodic slow wave line structure 223 are sequentially arranged at equal intervals in the first direction, the plurality of periodic slow wave lines 201 of the fourth periodic slow wave line structure 226 are sequentially arranged at equal intervals in the first direction, the plurality of periodic slow wave lines 201 of the fifth periodic slow wave line structure 232 are sequentially arranged at equal intervals in the first direction, and the plurality of periodic slow wave lines 201 of the sixth periodic slow wave line structure 233 are sequentially arranged at equal intervals in the first direction, such that radiation intensity of the first patch 210, radiation intensity of the second patch 220 and radiation intensity of the third patch 230 are further improved.

In some embodiments, line widths of the periodic slow wave lines 201 each are 0.3 mm to 1 mm, and a distance between two adjacent periodic slow wave lines 201 of the same slow wave line structure is 0.3 mm to 1 mm. In an embodiment, line widths of the periodic slow wave lines 201 each are 0.5 mm, and a distance between two adjacent periodic slow wave lines 201 of the same slow wave line structure is 0.5 mm.

It should be noted that the disclosed technology does not limit the line widths of all the periodic slow wave lines 201 and the distance between the two adjacent periodic slow wave lines 201 of the same slow wave line structure. In another embodiment, line widths of the periodic slow wave lines 201 each are 0.8 mm, and a distance between two adjacent periodic slow wave lines 201 of the same slow wave line structure is 1 mm.

In some embodiments, with reference to FIGS. 3-6 and 7, the connecting line 240 includes a first connecting patch 241, a bent structure 242 and a second connecting patch 243 that are sequentially connected. The first connecting patch 241 is connected with a first radiation unit. The second connecting patch 243 is connected with a second radiation unit. The bent structure 242 includes two linear wires 244 that are parallel to each other and arranged oppositely, and a connecting part 245 configured to connect the two linear wires 244.

The bent structure 242 includes the two linear wires 244 that are parallel to each other and arranged oppositely. When currents flow through the two linear wires 244, currents flowing through the two linear wires 244 flow in opposite directions, such that a radiation pattern deterioration effect caused by reverse currents can be counteracted. In addition, it should be noted that the disclosed technology does not limit the number of linear wires 244 and the number of connecting parts 245, which are included in the bent structure. In an embodiment, the bent structure includes five linear wires 244 and four connecting parts 245. In another embodiment, the bent structure includes six linear wires 244 and five connecting parts 245.

In some embodiments, the first connecting patch 241, the bent structure 242 and the second connecting patch 243 are sequentially arranged in the first direction. A size of the first connecting patch 241 in the first direction is 10 mm to 14 mm, and a size of the first connecting patch 241 in the second direction is 1.5 mm to 2.5 mm. A size of the second connecting patch 243 in the first direction is 17 mm to 22 mm, and a size of the second connecting patch 243 in the second direction is 1.5 mm to 2.5 mm. A size of the bent structure 242 in the second direction is 8 mm to 10 mm. A distance between the two linear wires 244 is 0.6 mm to 1.5 mm. In an embodiment, a size of the first connecting patch 241 in the first direction is 11.5 mm, a size of the first connecting patch 241 in the second direction is 2 mm, a size of the second connecting patch 243 in the first direction is 19 mm, a size of the second connecting patch 243 in the second direction is 2 mm, a size of the bent structure 242 in the second direction is 9 mm, and a distance between the two linear wires 244 is 1 mm.

It should be noted that the disclosed technology does not limit the size of the first connecting patch 241 in the first direction, the size of the first connecting patch 241 in the second direction, the size of the second connecting patch 243 in the first direction, the size of the second connecting patch 243 in the second direction, the size of the bent structure 242 in the second direction, and the distance between the two linear wires 244. In another embodiment, a size of the first connecting patch 241 in the first direction is 12.5 mm, a size of the first connecting patch 241 in the second direction is 1.5 mm, a size of the second connecting patch 243 in the first direction is 18.6 mm, a size of the second connecting patch 243 in the second direction is 1.5 mm, a size of the bent structure 242 in the second direction is 8.5 mm, and a distance between the two linear wires 244 is 0.7 mm.

In some embodiments, the antenna further includes a dielectric plate 250. The first patch 210, the second patch 220, the connecting line 240 and the third patch 230 are all fixed on the dielectric plate 250. In an embodiment, the dielectric plate 250 is an insulating dielectric plate. A size of the dielectric plate 250 in the first direction is 110 mm to 128 mm, and a size of the dielectric plate 250 in the second direction is 11 mm to 15 mm. In an embodiment, a length of the dielectric plate 250 in the first direction is 120 mm, and a width of the dielectric plate 250 in the second direction is 13 mm.

It should be noted that the disclosed technology does not limit the size of the dielectric plate 250 in the first direction and the size of the dielectric plate 250 in the second direction. In another embodiment, a length of the dielectric plate 250 in the first direction is 121 mm, and a width of the dielectric plate 250 in the second direction is 13.5 mm.

Figure 8:
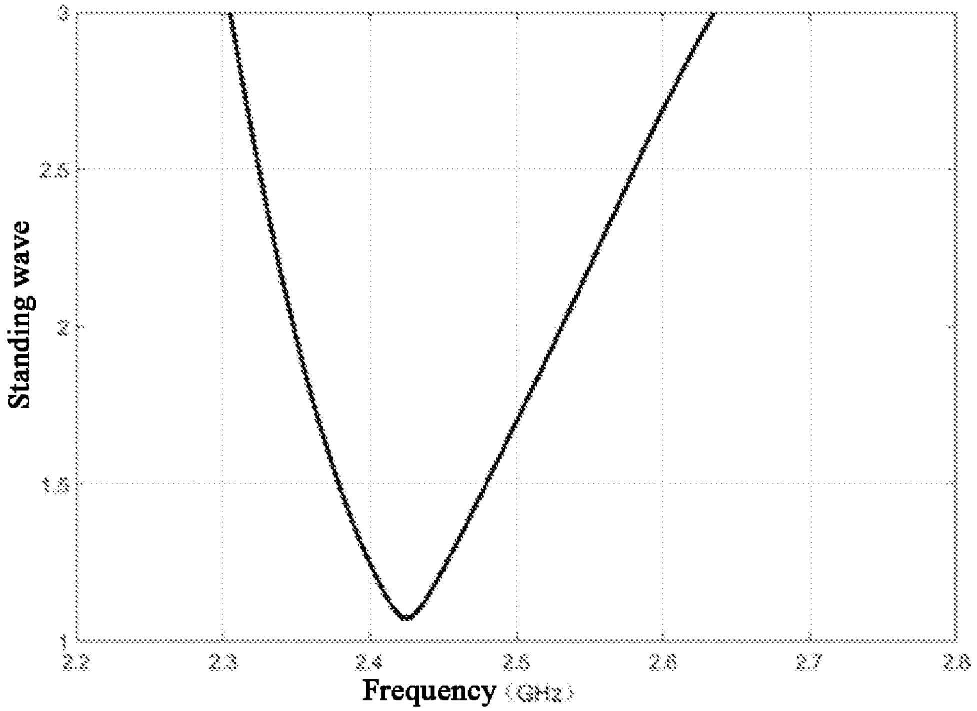
FIG. 8 is a schematic diagram of simulation results of variation of a standing-wave ratio of an antenna with frequency according to some embodiments of the disclosed technology.

With reference to FIG. 8, a horizontal axis of FIG. 8 represents frequency, and a vertical axis of FIG. 8 represents standing-wave ratios. A curve in FIG. 8 is a simulation curve of a standing-wave ratio of an antenna according to an embodiment of the disclosed technology. According to a schematic diagram of simulation results of variation of a standing-wave ratio of an antenna with frequency according to the embodiment of the disclosed technology, it may be seen that the antenna according to the embodiment of the disclosed technology has a standing-wave coefficient VSWR (VSWR: a voltage standing wave ratio) less than 2 in a working frequency range of 2.4 GHz to 2.5 GHz (GHz: Gigahertz), and has desirable impedance matching characteristics.

Figure 9:
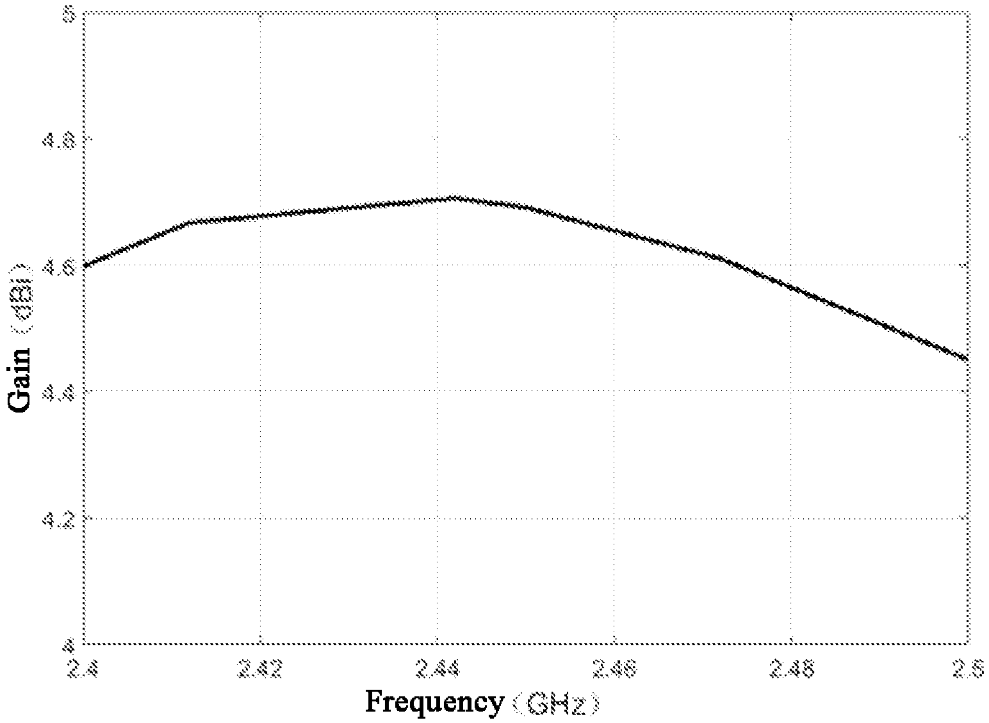
FIG. 9 is a schematic diagram of simulation results of variation of peak gain of an antenna with frequency according to some embodiments of the disclosed technology.

With reference to FIG. 9, a horizontal axis of FIG. 9 represents frequency, and a vertical axis of FIG. 9 represents peak gain. A curve in FIG. 9 is a simulation curve of peak gain of an antenna according to an embodiment of the disclosed technology. According to a schematic diagram of simulation results of variation of peak gain of an antenna with frequency according to the embodiment of the disclosed technology, it may be seen that the antenna according to the embodiment of the disclosed technology has peak gain greater than 4.4 dBi (dBi: power gain unit) in a working frequency range of 2.4 GHz to 2.5 GHz.

Figure 10:
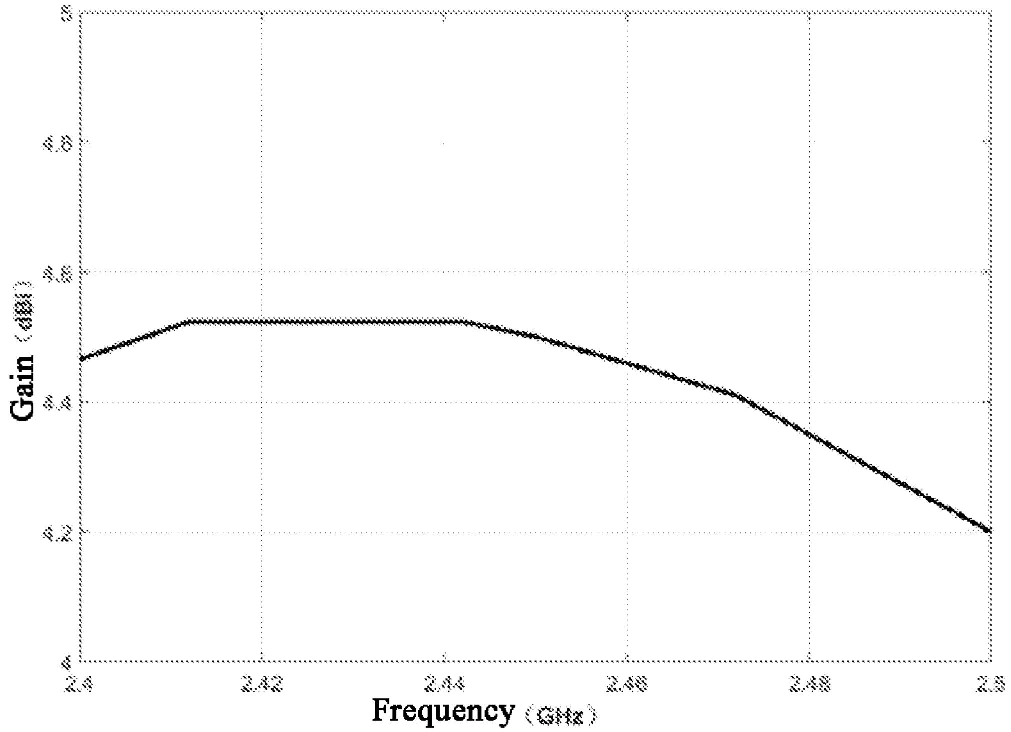
FIG. 10 is a schematic diagram of simulation results of variation of peak gain of a theta=90° horizontal plane of an antenna with frequency according to some embodiments of the disclosed technology.

With reference to FIG. 10, a horizontal axis of FIG. 10 represents frequency, and a vertical axis of FIG. 10 represents peak gain of a theta=90° horizontal plane of an antenna. A curve in FIG. 10 is a simulation curve of peak gain of a theta=90° horizontal plane of an antenna according to an embodiment of the disclosed technology. According to a schematic diagram of simulation results of variation of peak gain of a theta=90° horizontal plane of an antenna with frequency according to the embodiment of the disclosed technology, it may be seen that the antenna according to the embodiment of the disclosed technology has peak gain of a horizontal plane greater than 4.2 dBi in a working frequency range of 2.4 GHz to 2.5 GHz.

Figure 11:
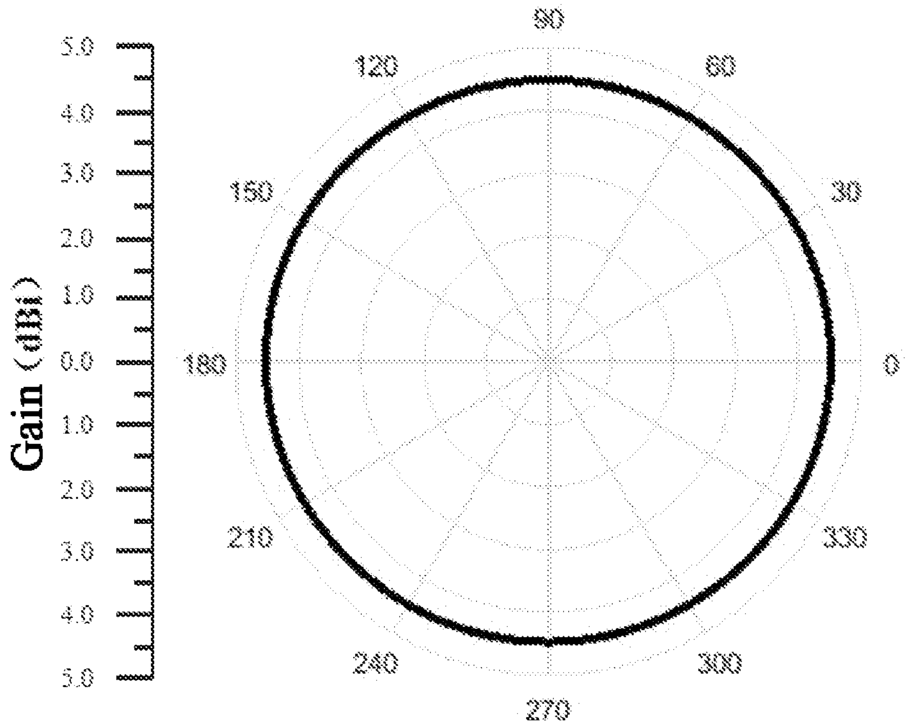
FIG. 11 is a two-dimensional far-field radiation pattern of an antenna on a theta=90° horizontal plane at a frequency point of 2.442 GHz according to some embodiments of the disclosed technology.

With reference to FIG. 11, a curve of FIG. 11 represents a two-dimensional far-field radiation direction of an antenna on a theta=90° horizontal plane at a frequency point of 2.442 GHz according to an embodiment of the disclosed technology. According to a two-dimensional far-field radiation pattern of an antenna on a theta=90° horizontal plane at a frequency point of 2.442 GHz according to the embodiment of the disclosed technology, it may be seen that the antenna according to the embodiment of the disclosed technology has very low out-of-roundness in the radiation pattern on the horizontal plane. It may be seen that the antenna according to the embodiment of the disclosed technology has excellent omnidirectional radiation performance in the frequency range. Out-of-roundness is an important index to measure the omnidirectional radiation performance of the antenna.

Some embodiments of the disclosed technology provide a communication device. The communication device includes an antenna. The antenna includes: a first patch and a second patch. One of the first patch and the second patch is a choke patch, and the other one of the first patch and the second patch is a radiation patch. The first patch includes a first body, a first periodic slow wave line structure, and a first pad. The first body is provided with a first side and is provided with a first accommodating notch on the first side. The first periodic slow wave line structure is located within the first accommodating notch and connected with an edge of the first accommodating notch. The first pad is located on the first body and connected with the first body. The first accommodating notch penetrates the first body in a thickness direction of the first body. The second patch includes a second body and a second pad. The second pad is located on the second body and connected with the second body. The first pad is arranged adjacent to the second pad. The first body and the second body are sequentially arranged in a first direction. A gap is provided between the first body and the second body.

In fact, the antenna included in the communication device according to the embodiments is the same as the antenna according to the above embodiments, so the communication device according to the embodiments also has the same technical effects as the antenna according to the above embodiments, which will not be repeated herein.

In some embodiments, the communication device according to the embodiments is a router. In this way, a Wi-Fi (a wireless communication technology) antenna of the router can be miniaturized, and meanwhile, the router can be miniaturized.

What is claimed is:

1. An antenna, comprising:

a first patch and a second patch, wherein one of the first patch and the second patch is a choke patch, and the other of the first patch and the second patch is a radiation patch;

wherein the first patch comprises a first body, a first periodic slow wave line structure, and a first pad, the first body is provided with a first side and is provided with a first accommodating notch on the first side, the first periodic slow wave line structure is located within the first accommodating notch and connected with an edge of the first accommodating notch, and the first pad is located on the first body and connected with the first body, wherein the first accommodating notch penetrates the first body in a thickness direction of the first body; and wherein the second patch comprises a second body and a second pad, and the second pad is located on the second body and connected with the second body, wherein the first pad is arranged adjacent to the second pad, the first body and the second body are sequentially arranged in a first direction, and a gap is provided between the first body and the second body, wherein the first periodic slow wave line structure comprises a plurality of periodic slow wave lines sequentially arranged at intervals in the first direction.

2. The antenna according to claim 1, wherein the first patch further comprises a second periodic slow wave line structure, the first body is further provided with a second side opposite the first side and is provided with a second accommodating notch on the second side, and the second periodic slow wave line structure is located within the second accommodating notch and connected with an edge of the second accommodating notch, wherein the second accommodating notch penetrates the first body in the thickness direction of the first body.

3. The antenna according to claim 1, wherein the second patch further comprises a third periodic slow wave line structure, the second body is provided with a third side and is provided with a third accommodating notch on the third side, and the third periodic slow wave line structure is located within the third accommodating notch and connected with an edge of the third accommodating notch, wherein the third accommodating notch penetrates the second body in a thickness direction of the second body.

4. The antenna according to claim 3, wherein the second patch further comprises a fourth periodic slow wave line structure, the second body is further provided with a fourth side opposite the third side and is provided with a fourth accommodating notch on the fourth side, and the fourth periodic slow wave line structure is located within the fourth accommodating notch and connected with an edge of the fourth accommodating notch, wherein the fourth accommodating notch penetrates the second body in the thickness direction of the second body.

5. The antenna according to claim 1, wherein the first body is further provided with a second side, and the first side is arranged opposite the second side in a second direction, wherein the first direction is perpendicular to the second direction; and wherein each of the periodic slow wave lines comprises a first end and a second end, the first end of each of the periodic slow wave lines is connected with the edge of the first accommodating notch, and second ends of all the periodic slow wave lines are sequentially arranged in the first direction.

6. The antenna according to claim 5, wherein the plurality of periodic slow wave lines each have a linear shape, a curved shape, or a folded shape.

7. The antenna according to claim 5, wherein the plurality of periodic slow wave lines are sequentially arranged at equal intervals in the first direction.

8. The antenna according to claim 5, wherein a length of the choke patch in the first direction is a quarter of a wavelength of a central working frequency of the antenna.

9. The antenna according to claim 1, further comprising: a third patch and a connecting line, wherein one of the first patch and the second patch is a choke patch, the other one of the first patch and the second patch is a first radiation patch, and the third patch is a second radiation patch; and wherein the choke patch, the first radiation patch, the connecting line and the second radiation patch are sequentially arranged in the first direction or an opposite direction of the first direction, wherein the first radiation patch and the second radiation patch are both connected with the connecting line.

10. The antenna according to claim 9, wherein a length of the choke patch in the first direction is a quarter of a wavelength of a central working frequency of the antenna; and a length of the connecting line in the first direction is a half of the wavelength of the central working frequency of the antenna.

11. The antenna according to claim 10, wherein the connecting line comprises a first connecting patch, a bent structure and a second connecting patch that are sequentially connected, the first connecting patch is connected with a first radiation unit, the second connecting patch is connected with a second radiation unit, and the bent structure comprises two linear wires that are parallel to each other and arranged oppositely, and a connecting part configured to connect the two linear wires.

12. A communication device, comprising an antenna, wherein the antenna comprises:

a first patch and a second patch, wherein one of the first patch and the second patch is a choke patch, and the other of the first patch and the second patch is a radiation patch;

wherein the first patch comprises a first body, a first periodic slow wave line structure, and a first pad, the first body is provided with a first side and is provided with a first accommodating notch on the first side, the first periodic slow wave line structure is located within the first accommodating notch and connected with an edge of the first accommodating notch, and the first pad is located on the first body and connected with the first body, wherein the first accommodating notch penetrates the first body in a thickness direction of the first body; and wherein the second patch comprises a second body and a second pad, and the second pad is located on the second body and connected with the second body, wherein the first pad is arranged adjacent to the second pad, the first body and the second body are sequentially arranged in a first direction, and a gap is provided between the first body and the second body, wherein the first periodic slow wave line structure comprises a plurality of periodic slow wave lines sequentially arranged at intervals in the first direction.

13. The communication device according to claim 12, wherein the communication device is a router.

14. The communication device according to claim 12, wherein the first patch further comprises a second periodic slow wave line structure, the first body is further provided with a second side opposite the first side and is provided with a second accommodating notch on the second side, and the second periodic slow wave line structure is located within the second accommodating notch and connected with an edge of the second accommodating notch, wherein the second accommodating notch penetrates the first body in the thickness direction of the first body.

15. The communication device according to claim 12, wherein the second patch further comprises a third periodic slow wave line structure, the second body is provided with a third side and is provided with a third accommodating notch on the third side, and the third periodic slow wave line structure is located within the third accommodating notch and connected with an edge of the third accommodating notch, wherein the third accommodating notch penetrates the second body in a thickness direction of the second body.

16. The communication device according to claim 15, wherein the second patch further comprises a fourth periodic slow wave line structure, the second body is further provided with a fourth side opposite the third side and is provided with a fourth accommodating notch on the fourth side, and the fourth periodic slow wave line structure is located within the fourth accommodating notch and connected with an edge of the fourth accommodating notch, wherein the fourth accommodating notch penetrates the second body in the thickness direction of the second body.

17. The communication device according to claim 12, wherein the first body is further provided with a second side, and the first side is arranged opposite the second side in a second direction, wherein the first direction is perpendicular to the second direction; and wherein each of the periodic slow wave lines comprises a first end and a second end, the first end of each of the periodic slow wave lines is connected with the edge of the first accommodating notch, and second ends of all the periodic slow wave lines are sequentially arranged in the first direction.

18. The communication device according to claim 17, wherein the plurality of periodic slow wave lines each have a linear shape, a curved shape, or a folded shape.

19. The communication device according to claim 17, wherein the plurality of periodic slow wave lines are sequentially arranged at equal intervals in the first direction.

20. The communication device according to claim 17, wherein a length of the choke patch in the first direction is a quarter of a wavelength of a central working frequency of the antenna.

* * * * *